(12) United States Patent
Yamahira et al.

(10) Patent No.: US 6,355,372 B2
(45) Date of Patent: *Mar. 12, 2002

(54) NON-AQUEOUS ELECTROLYTE SECONDARY CELL

(75) Inventors: Takayuki Yamahira; Ayaki Watanabe, both of Fukushima; Toshizou Kameishi; Koji Kihara, both of Nara, all of (JP)

(73) Assignees: Sony Corporation, Tokyo; Wako Electronics Co., Ltd., Osaka, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/196,319

(22) Filed: Nov. 20, 1998

(30) Foreign Application Priority Data

Nov. 21, 1997 (JP) ................................. 9-321734

(51) Int. Cl.⁷ ........................... H01M 2/12; H01M 2/04; H01M 10/40
(52) U.S. Cl. ....................... 429/56; 429/175; 429/231.8
(58) Field of Search .................................. 429/56, 175

(56) References Cited

U.S. PATENT DOCUMENTS

| 4,939,050 A | * | 7/1990 | Toyosawa et al. | ........ 429/56 X |
| 5,595,835 A | | 1/1997 | Miyamoto et al. | ........... 429/56 |

FOREIGN PATENT DOCUMENTS

| EP | 0 125 037 | | 11/1984 |
| EP | 0 862 229 A1 | | 9/1998 |
| JP | 60-165040 | * | 8/1985 |
| JP | 05314959 | | 11/1993 |
| JP | 9-35699 | * | 2/1997 |
| JP | 10-144277 | * | 5/1998 |
| JP | 10-172529 | * | 6/1998 |
| WO | WO97/30482 | | 12/1998 |

OTHER PUBLICATIONS

07050159; Patent Abstract of Japan; Feb. 1995; XP–002095506.
06068861; Patent Abstract of Japan; Jun. 1994.
07169452; Patent Abstract of Japan; Nov. 1995.
01112653; Patent Abstract of Japan; Aug. 1989.
10172529; Patent Abstract of Japan; Sep. 1998.
10144277; Patent Abstract of Japan; Aug. 1998.
09035699; Patent Abstract of Japan; Jun. 1997; XP–002095505.
60165040; Patent Abstract of Japan; Jan. 1986.
05314959; Patent Abstract of Japan; Feb. 1994.

* cited by examiner

Primary Examiner—Gabrielle Brouillette
Assistant Examiner—Jonathan Crepeau
(74) Attorney, Agent, or Firm—Sonnenschein, Nath & Rosenthal

(57) ABSTRACT

An extremely safe non-aqueous electrolyte secondary cell free of explosions and which can promptly release the internal pressure in case of rise in the internal pressure. The non-aqueous electrolyte secondary cell has in its opening a cleavage valve obtained on bonding a metal foil to the opening. In case of rise in the internal pressure, the cleavage valve is cleft to release the pressure. In this cell, a value K corresponding to the internal volume in the cell in $cm^3$ divided by the area of the opening in $cm^2$ is set so that $40 \leq K \leq 350$. By selecting the value K to a suitable value, the cleavage valve is in operation when the internal pressure reaches a predetermined value to release the pressure. The metal foil is produced by, for example, a electro-forming method or a cladding method. Preferably, a fluorine-based water-proofing agent is coated on the foil surface.

12 Claims, 9 Drawing Sheets

NON-AQUEOUS ELECTROLYTE SECONDARY CELL

BACKGROUND OF THE INVENTION

1. Field of the Invention

This invention relates to a non-aqueous electrolyte secondary cell. More particularly, it relates to a non-aqueous electrolyte secondary cell having a cleavage valve which, in case of an increased internal pressure, releases the pressure by exploiting this increased internal pressure.

2. Description of the Related Art

Recently, with coming into widespread use of portable equipments, such as video cameras or cassette recorders, there is raised an increasing demand for secondary cells that can be repeatedly used in place of the disposable primary cells.

The majority of currently used secondary cells are nickel-cadmium cells employing an alkali electrolyte liquid. However, this aqueous solution type cell has a discharging potential as low as approximately 1.2 V and a large cell weight and volume such that it cannot satisfactorily meet the demand for a cell having a high energy density. The aqueous solution type cell also has a drawback that it has a self discharge rate as high as approximately 20% per month at ambient temperature.

Thus, a non-aqueous electrolyte secondary cell employing a non-aqueous solvent as the electrolyte solution and also employing light metals, such as lithium as the negative electrode, is under investigations. This non-aqueous electrolyte secondary cell has a voltage as high as 3 V or higher, a high energy density and a low self-discharge rate.

However, this sort of the secondary cell also can hardly be put to practical use because of a drawback that metal lithium used for the negative electrode undergoes dendritic crystal growth to contact with the positive electrode, due to repetition of charging/discharging, as a result of which shorting tends to be produced in the cell to lower the service life of the cell.

In order to overcome this drawback, a non-aqueous electrolyte secondary cell employing, as a negative electrode, an alloy obtained on alloying lithium with other metals, is also under investigations.

In this case, however, the alloy is turned into comminuted particles, due to repetition of charging/discharging, thus again lowering the service life of the cell.

Under this situation, there is proposed a non-aqueous electrolyte secondary cell employing a carbonaceous material, such as coke, as an active material for the negative electrode.

This secondary cell is free of the above-mentioned drawbacks in the negative electrode and hence is superior in cyclic service life characteristics. If a lithium transition metal complex oxide is used as an active material for the positive electrode, the service life of the cell is prolonged to enable realization of the non-aqueous electrolyte secondary cell having the desired high energy density.

Meanwhile, in a non-aqueous electrolyte secondary cell employing the carbonaceous material as a negative electrode, there is required a pressure relieving mechanism for promptly releasing the pressure when the cell is subjected to an abnormal temperature rise or combustion.

If this pressure relieving mechanism comes into operation to release the gas when the internal pressure in the cell reaches a predetermined pressure, there can be provided an extremely safe cell free from explosions or the like.

SUMMARY OF THE INVENTION

It is therefore an object of the present invention to provide an extremely safe non-aqueous electrolyte secondary cell capable of promptly releasing an increasing internal pressure and which is free from explosion or the like.

As a result of repeated investigations towards achieving the above object, the present inventors have arrived at the information that a non-aqueous electrolyte secondary cell free from explosions or the like can be provided by providing a cleavage valve that is cleft in case of rise in the internal pressure of the cell and by optimizing the diameter of the opening of the valve in association with the internal capacity of the cell to optimize the operating pressure to carry out satisfactory gas release at the time of abnormal pressure increase or on combustion.

The present invention, completed on the basis of this information, resides in a non-aqueous electrolyte secondary cell having a cleavage valve which is realized by bonding a metal foil to an opening in the valve. The metal foil is cleft due to rise in the internal pressure in the cell to release the pressure. A value K corresponding to the internal cell volume in $cm^3$ divided by the area of the opening in $cm^2$ is such that $40 \leq K \leq 100 \ \mu m$.

By selecting the K value to be a suitable value, the cleavage valve is in operation promptly when the internal pressure reaches a predetermined pressure in order to release the pressure. Thus, there is no risk of dilation or explosion of the cell to assure high operational safety.

Thus, the present invention provides an extremely safe cell free from explosions since gas release may be promptly realized on the occasion of rise in the internal pressure in the cell.

DESCRIPTION OF THE PREFERRED EMBODIMENTS

A non-aqueous electrolyte secondary cell of the present invention includes a cleavage valve obtained on bonding a metal foil to an opening provided in a cell can or a lid plate used for hermetically sealing the can. The cleavage valve is cleft on the occasion of rise in the internal pressure to cleave the metal foil to relieve the pressure.

Figure 1:
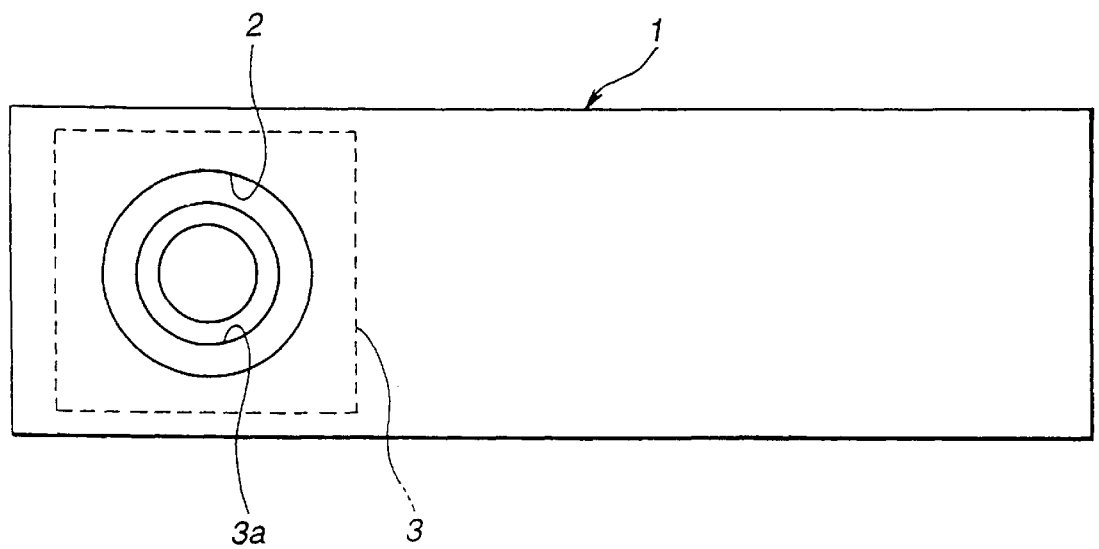
FIG. 1 is a schematic plan view showing an illustrative structure of a cleavage valve.
Figure 2:
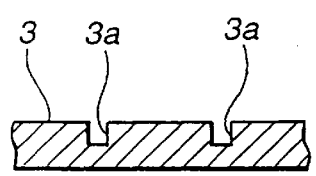
FIG. 2 is a schematic cross-sectional view showing essential portions of a metal foil formed by an electroforming method.

FIG. 1 shows an example of a lid plate provided with such cleavage valve. A circular opening 2 is provided in the lid plate 1 shaped to conform to the opening shape of the cell can, and a metal foil 3 is welded, such as by laser welding, to close the opening 2.

The shape of the opening 2, which is circular in the present embodiment, may be of any suitable shape, such as elliptical shape. The circular shape, however, is preferred in view of operational stability and ease in manufacture.

The metal foil 3, which is square-shaped in the present embodiment, may be of any desired shape, provided that it can stop the opening 2. The metal foil 3 may, for example, be circular for matching to the shape of the opening 2.

The metal foil 3 is formed with a circular thin-walled portion 3a, in its area facing the inside of the opening 2, and is adapted to be cleft beginning from this portion on the occasion of rise in the internal pressure.

For this metal foil 3, the thin-walled portion 3a may be formed by any optional technique, such as by etching, electro-forming or stamping. The electro-forming method is preferred in view of fluctuations in the cleavage pressure.

The electroforming, which is so-called electro-casting, is such a technique in which a pattern is formed by a photoresist, an insulating film is prepared, a substrate is supplied with current, and preset metal is allowed to undergo crystal growth to form an electrically conductive portion to produce a pattern of lands and valleys under a principle similar to that used for plating.

This electro-forming is an optimum technique for controlling the cleavage pressure to a narrow tolerance since the crystal growth can be controlled electrically in contradistinction to the similar photoetching method and hence a film can be prepared with a high processing accuracy.

The technique for fabricating the cleavage valve by the above electro-forming is shown in FIG. 3. For fabricating the cleavage valve, a first resist pattern 12 which determines the outer shape of the cleavage valve is formed on the substrate 11 by a photolithographic process employing a photoresist. Using this resist pattern as a mask, Ni is plated on the substrate.

Figure 3A:
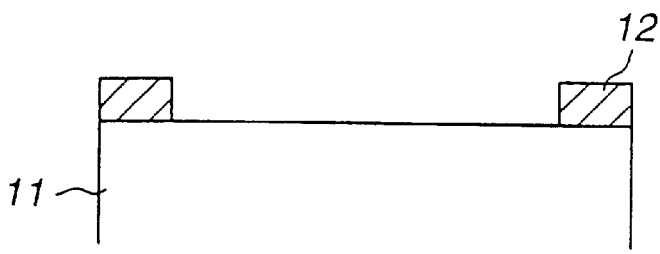
FIGS. 3A–E is a schematic cross-sectional views showing the method for forming the cleavage valve by the electroforming method, step-by-step.
Figure 3B:
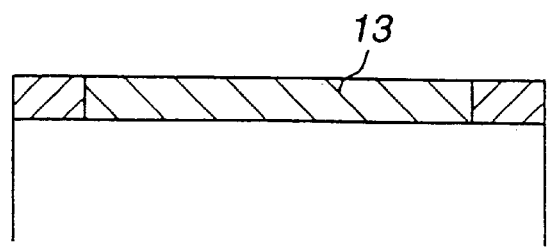

This forms a first Ni plating film 13, as shown in FIG. 3B. It is the thickness of this first Ni plating film 13 that determines the thickness of the thin-walled portion 3a. Therefore, the first Ni plating film 13 is set to a thickness of the order of 10 to 12 $\mu$m in order to permit smooth cleavage of the cleavage valve at the pressure rise time.

Figure 3C:
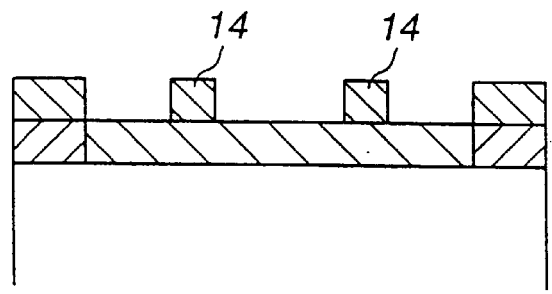
Figure 3D:
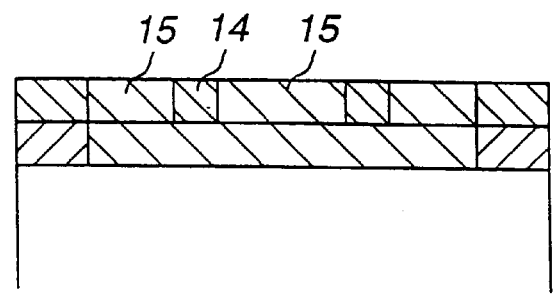

Then, as shown in FIG. 3C, a circular second resist pattern 14 is formed to the shape of a cleavage and again Ni is plated thereon as shown in FIG. 3D to form a second Ni plating film 15. The combined film thickness of the second Ni plating film 15 and the previously formed first Ni plating film 13 may, for example, be 40 $\mu$m or more.

Figure 3E:
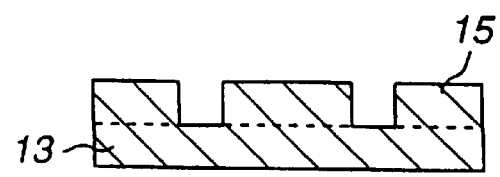
Figure 4:
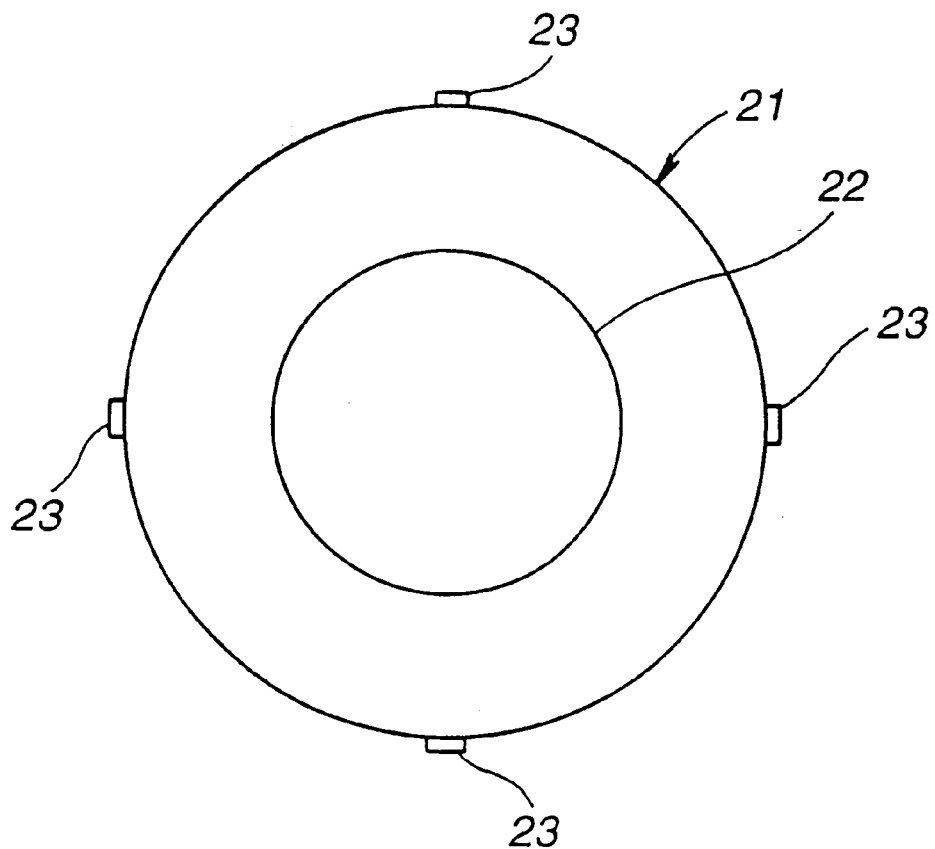
FIG. 4 is a schematic cross-sectional view showing a typical cleavage valve produced by a stamping method.

The first Ni plating film 13 and the second Ni plating film 15 are formed and the resist patterns 12, 14 are fused and removed to produce a cleavage valve having the thin-walled portion formed therein to he shape of the second resist pattern 14, as shown in FIG. 3E.

With a cleavage valve by stamping, a circular groove 22 is formed by pressing in a circular metal plate 21 to form a thin-walled portion. In the present instance, since punching is done consecutively, traces of connecting portions to a hoop material are left as four projections 23.

Figure 5:
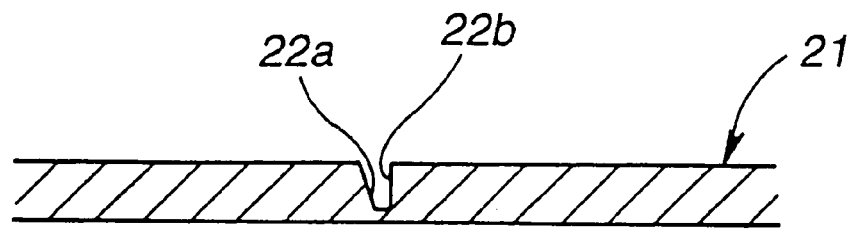
FIG. 5 is a schematic cross-sectional view showing essential portions of a groove formed by pressing.

If the groove 22 is formed by this stamping, it is preferred that an outer peripheral surface 22a of the groove 22 runs somewhat obliquely, for example, at an inclination of the order of 20°, as shown in FIG. 5. On the other hand, an inner peripheral surface 22b extends substantially vertically. This eliminates the risk of creasing in a cleavage valve (a circular area inwardly of the groove 22).

Figure 6:
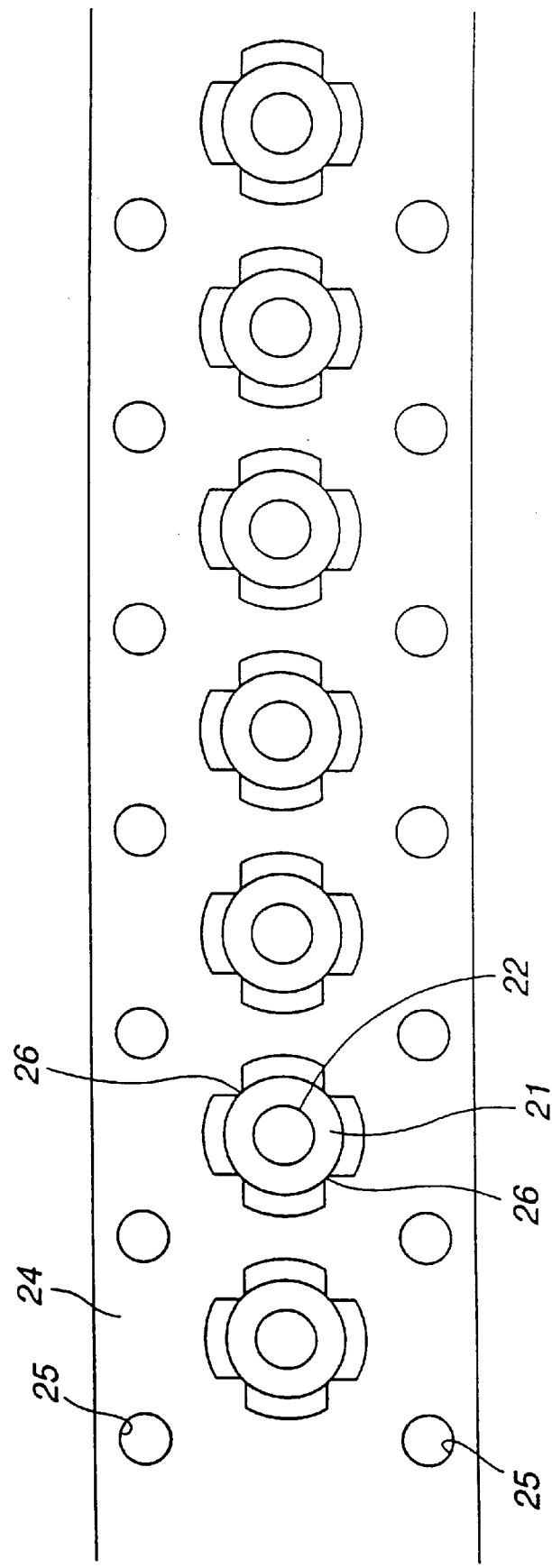
FIG. 6 is a schematic plan view showing essential portions of a supply device continuously supplying cleavage valves produced by the stamping method.

FIG. 6 shows the technique of continuously forming the cleavage valve. A hoop material 24 having positioning holes 25 is punched at a preset interval to determine the outer shape of the metal plate 21, and grooves 22 then are formed by stamping. The metal plate 21 is then handled in this state and ultimately a connecting plate 26 is severed. This enables continuous supply of cleavage valves in a manner convenient for line automation.

Figure 7:
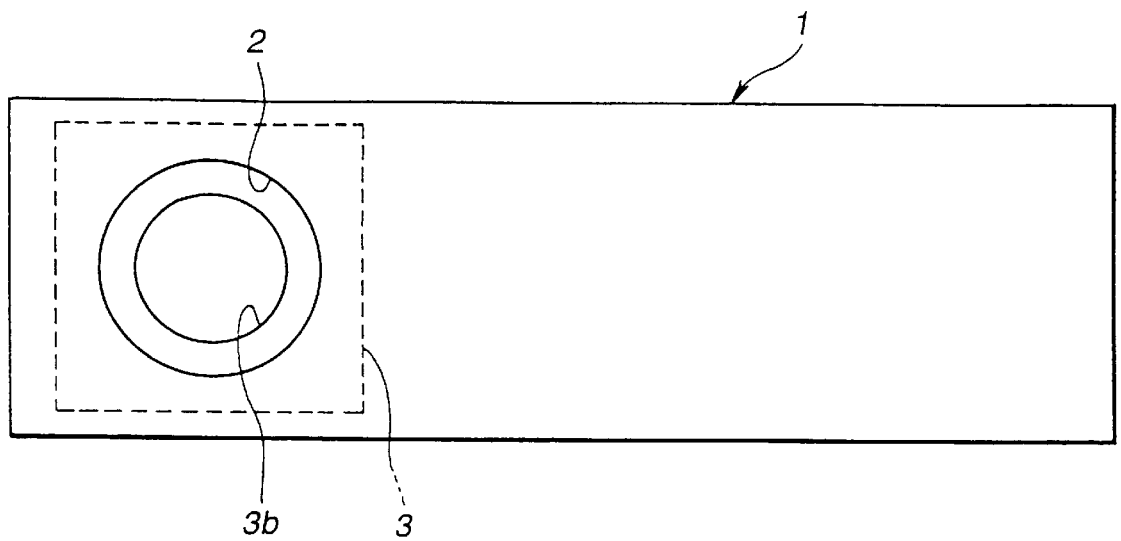
FIG. 7 is a schematic plan view showing another illustrative structure of the cleavage valve.
Figure 8:
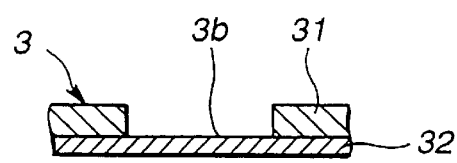
FIG. 8 is a schematic cross-sectional view showing a typical metal foil formed of a clad material.

Alternatively, a clad material, obtained on bonding a thick metal foil and a thin metal foil together, may be used. FIGS. 7 and 8 show a cleavage valve employing a clad material. The metal foil 3 is made up of a thick metal foil 31 and a thin metal foil 32. The thick metal foil 31 is removed in an area facing the inside of the opening 2 to a diameter smaller than the opening 2 to delimit a circular thin-walled portion 3b.

In any case, the metal foil 3 is preferably of a thickness of 40 to 100 $\mu$m. If the thickness is less than 40 $\mu$m, sufficient strength can hardly be developed on, for example, laser welding. Conversely, the thickness exceeding 100 $\mu$m is not desirable in view of productivity and also because of non-smooth cleavage.

On the metal foil 3 is preferably coated a fluorine-based water-proofing agent after bonding the metal foil 3 to the opening 2. If the metal foil 3 is formed by the electro-forming method to form the groove-shaped thin-walled portion 3a, and water droplets are deposited thereon, rusting tends to be produced because of difficulties in evaporation of water. If a fluorine-based water-proofing agent is coated, it is possible to prevent rusting to improve operational reliability.

In the above-described cleavage valve, as described above, an area of the opening 2 needs to be set to an optimum value depending on the inner cell volume.

In the present invention, the inner cell volume (in $cm^3$) divided by the area of the above opening (in $cm^2$) is set so that $40 \leq K \leq 350$ to optimize the cleavage pressure at all times.

Although the area of the opening 2 as large as possible is preferred, its upper limit is approximately one-half the area of the lid plate in view of the shape of the lid plate 1. If the physical limitation of the lid plate 1 is taken into account, the lower limit of the above K value is 40. If the opening 2 is of a true circular shape, the K value has a lower limit value of approximately 50. Conversely, if the K value is too large, that is if the area of the opening 2 is too small, the cleavage pressure will be excessive, thus producing cleavage of the weld and dilation of the cell can.

Thus, for practical application, the K value is preferably in a range from 80 to 320 and more preferably in a range from 85 to 240.

In addition to the cleavage valve, an electrode terminal, for example, is provided on a lid plate of the cell can.

Figure 9:
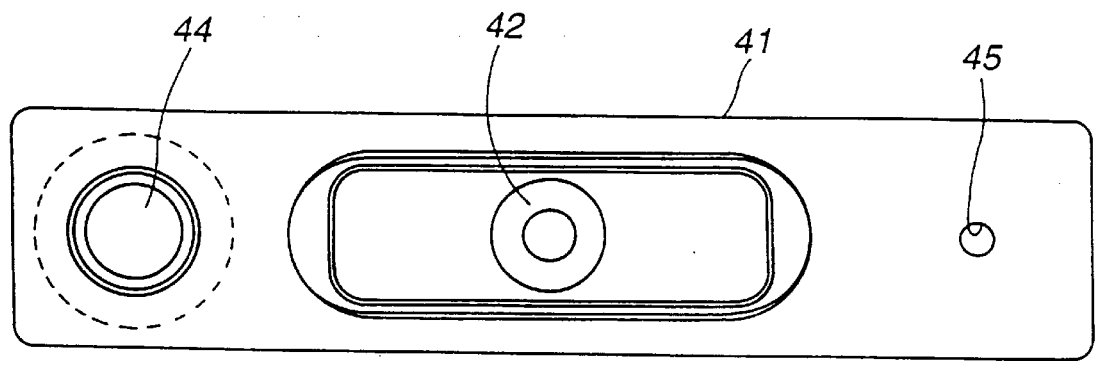
FIG. 9 is a schematic plan view showing a typical lid plate.
Figure 10:
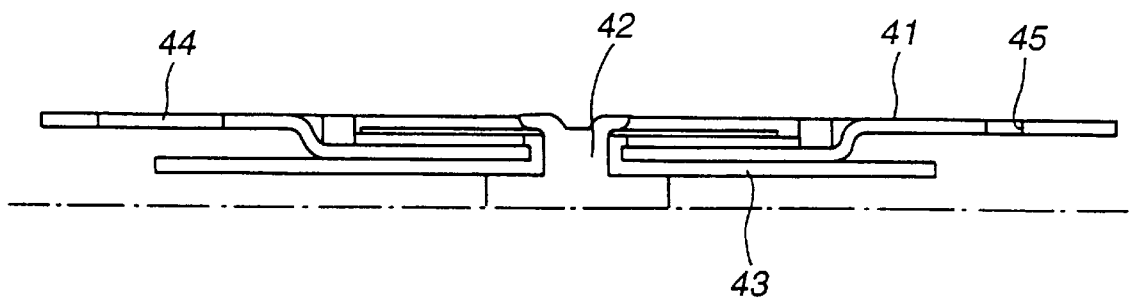
FIG. 10 is a schematic cross-sectional view showing the lid plate of FIG. 9.

FIGS. 9 and 10 show an example of a lid plate 41 of a cell can having some width. At a mid portion of the lid plate 41 is caulked a terminal pin 42 via a gasket 43. This terminal pin 42 is electrically connected via a lead to, for example, a positive terminal, in a manner not shown.

On both sides of the terminal pin 42 are arranged a cleavage valve 44 and a solution injection port 45 for injecting the electrolytic solution. In the present embodiment, since the lid plate 41 is of some width, the cleavage valve 44 has a substantially circular shape.

Figure 11:
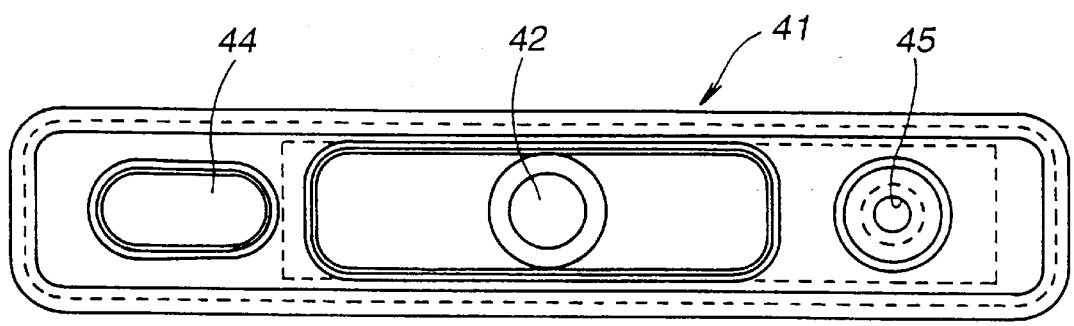
FIG. 11 is a schematic plan view showing another typical lid plate.
Figure 12:
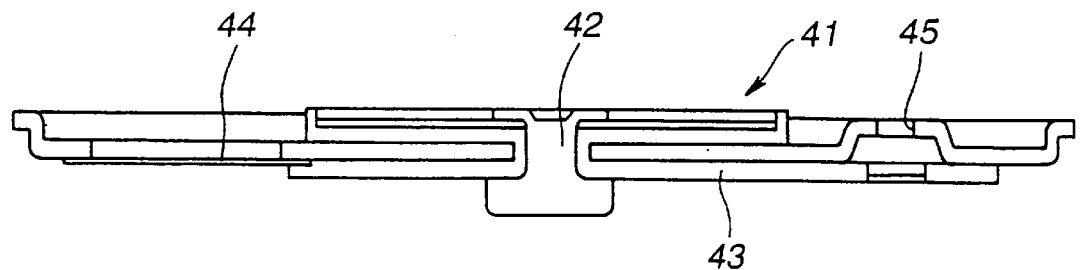
FIG. 12 is a schematic cross-sectional view showing the lid plate of FIG. 11.

FIGS. 11 and 12 show an example of the lid plate 41. Since the lid plate 41 of the present example is of narrow width, the cleavage valve 44 is of an oblong shape. The rim portion of the solution injection port 45 is formed with a step to improve mechanical strength. The provision of the step is aimed at assuring sufficient resistance against the force applied at the time of welding the solution injection port 45 using a micro-sized globule.

The non-aqueous electrolyte secondary cell according to the present invention has the above-described cleavage valve as its main feature. Otherwise, the cell may be constructed similarly to the conventional non-aqueous electrolyte secondary cell.

As an active material for the negative electrode of the non-aqueous electrolyte secondary cell, a variety of materials may be used depending on the type of the cell desired to be fabricated. Among the active material for the negative electrode, there is a carbonaceous material capable of doping and undoping metal ions, above all, lithium ions, that contribute to the cell reaction.

As this carbonaceous material, such carbonaceous material of low crystallinity produced on firing at a lower temperature not higher than 2000° C. or a carbonaceous material of low crystallinity obtained on processing a crystallizable starting material at an elevated temperature in the vicinity of 3000° C., may be used. Among the carbonaceous materials, petroleum pitch, a binder pitch, a high-molecular resin or green coke, are most preferred. In addition, completely carbonized pyrocarbon, cokes (pitch coke or petroleum coke), artificial graphites, natural graphites, carbon black (acetylene black or the like), vitreous carbon, fired organic high-molecular materials (natural high-molecular materials fired in an inert gas stream or in vacuum at a suitable temperature hot lower than 500° C.) or a mixture of carbon fibers with resin-containing pitches or resins showing high sinterability, such as furan resins, divinyl benzene, polyvinylidene fluoride or polyvinylidene chloride, may be used. In particular, a low crystallinity carbonaceous material having a plane-to-plane spacing of the (002) planes not less than 3.70Å and a true density less than 1.70 g/cc and having no heat emission peak at a temperature not lower than 700° C. on differential thermal analysis in an air stream, or a high crystallinity carbonaceous material having a high negative electrode mixture charging ratio and a true specific gravity not lower than 2.10 g/cc, may be used.

The negative electrode may be formed of metal lithium, a lithium alloy or a polymer doped with lithium.

As an active material for the positive electrode of the non-aqueous electrolyte secondary cell, metal oxides, metal sulfides or specified polymers may be used depending on the type of the cell desired to be produced. If a lithium ion secondary cell is to be fabricated, a lithium complex oxide containing $Li_xMO_2$, where M is at least one transition metal, preferably one of Co, Ni or Fe, with $0.05 \leq X \leq 1.10$. The lithium complex oxide may be exemplified by $LiCoO_2$, $LiNiO_2$ and $LiNiyCo_{(1-y)}O_2$, with $0.05 \leq X \leq 1.10$ and $0 \leq y \leq 1$. $LiMnO_4$ may also be used.

The above-mentioned lithium complex oxide may be obtained on mixing carbonates of, for example, lithium, cobalt or nickel, depending on the compositions, and firing the resulting mixture in an oxygen-containing atmosphere at a temperature from 400° to 1000° C. The starting material is not limited to carbonates and the lithium complex oxide may be fabricated from hydroxides or oxides.

If metal lithium or lithium alloys are used as the negative electrode, it is possible to use compounds that cannot undope lithium on initial charging, for example, a variety of oxides, such as manganese dioxide or titanium oxide, sulfides, such as titanium oxide or polymers, such as polyaniline, may be used as positive electrodes.

As a non-aqueous electrolyte used in the non-aqueous electrolyte secondary cell, it is possible to use a well-known non-aqueous electrolytic solution obtained on dissolving an electrolyte in an organic solvent.

As the organic solvents, esters, such as propylene carbonate, ethylene carbonate or γ-butyrolactone, diethyl ether, tetrahydrofuran, substituted tetrahydrofuran, dioxolane, pyran or derivatives thereof, ethers, such as dimethoxyethane or diethoxyethane, 3-substituted-2-oxazolidinines, such as 3-methyl-2-oxazolidinone, sulforane, methyl sulforane, acetonitrile or propionitrile, may be used. These may be used alone or in combination.

Examples of the electrolytes that may be used include lithium perchlorates, lithium boron fluorides, lithium phosphor fluorides, lithium chloride aliminates, lithium halogenides and trifluoromethane lithium sulfonates.

The non-aqueous electrolyte may also be a solid, in which case conventional well-known solid electrolytes may be used.

The electrode structure may be comprised of winding of a strip-shaped electrode fabricated on coating an active material on a current collector. Alternatively, the electrode may be comprised of layered plate-shaped electrodes on which an active material is held by coating or firing an active material on a current collector.

The cell may be of an angular, cylindrical or any other suitable configuration.

Figure 13:
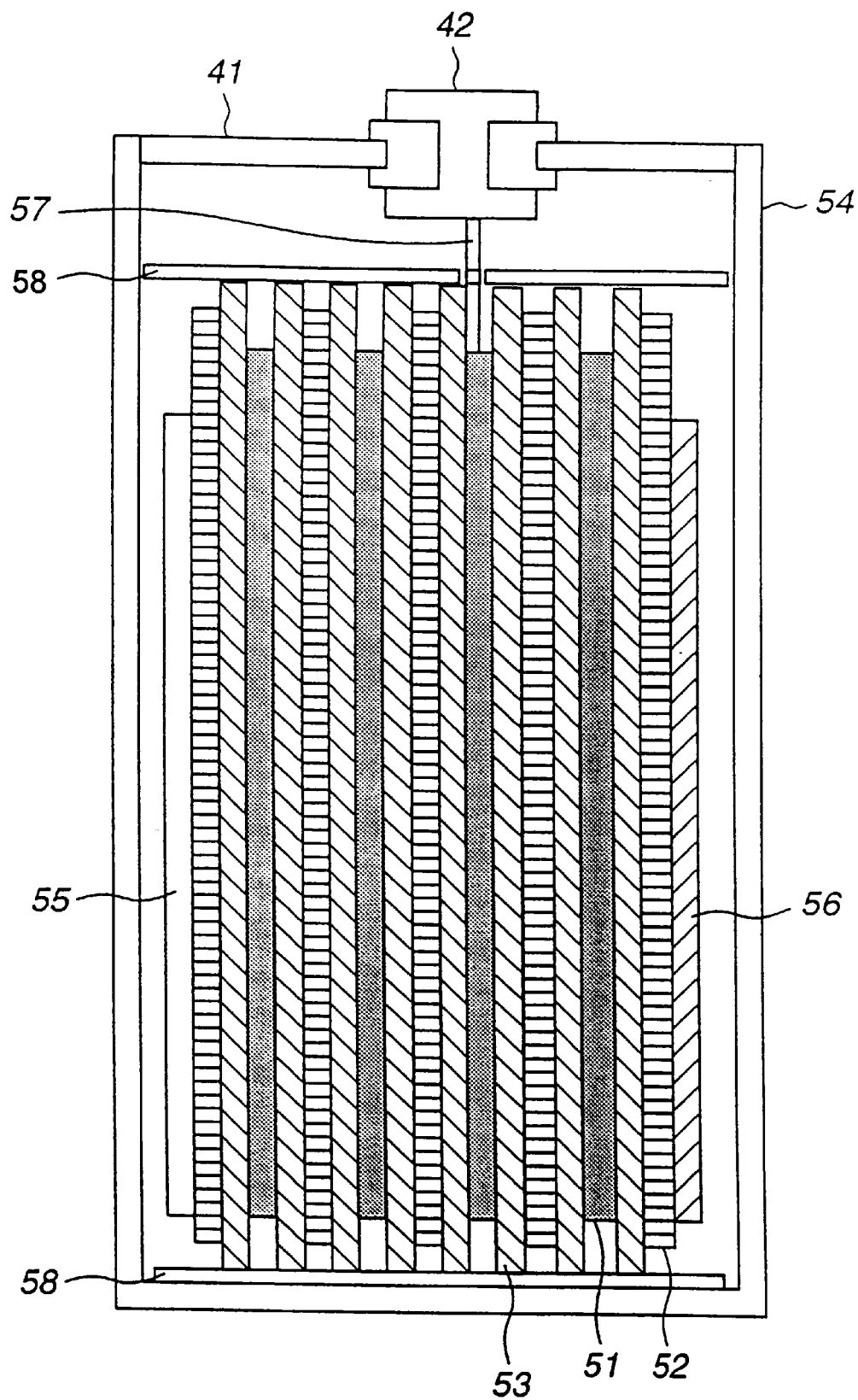
FIG. 13 is a schematic cross-sectional view showing a typical cell structure.

FIG. 13 shows a typical cell comprised of a positive electrode 51, a negative electrode 52 and a separator 53 layered together and wound in a coil which is then housed in a cell can 54. The cell element (wound pair) has its outermost rim secured by a winding end tape 55 and secured in the cell can 54 by a spring plate 56. Moreover, the cell element has its upper and lower ends sandwiched between insulating layers 57, 58 so as to be stably housed in the cell can 54.

The above-mentioned lid plate 41 is secured to the cell can 54 to seal the opening. To the terminal pin 42 is connected a positive electrode lead 57 derived from the positive electrode 51. Thus, with the present cell, the cell can 54 and the terminal pin 52 operate as negative and positive electrodes, respectively.

For avoiding inadvertent breakage and for assuring a facilitated connecting operation, the positive electrode lead 57 is usually designed to a longer length and its extracted end is folded and connected to the terminal pin 42.

Figure 14:
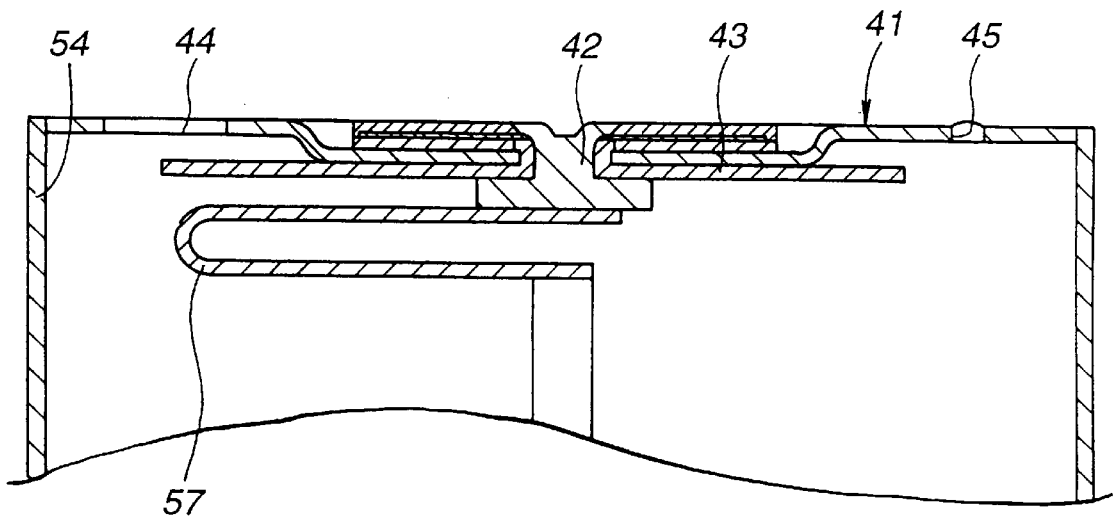
FIG. 14 is a schematic cross-sectional view showing the state in which a positive terminal lead is folded in a direction towards the cleavage valve side.
Figure 15:
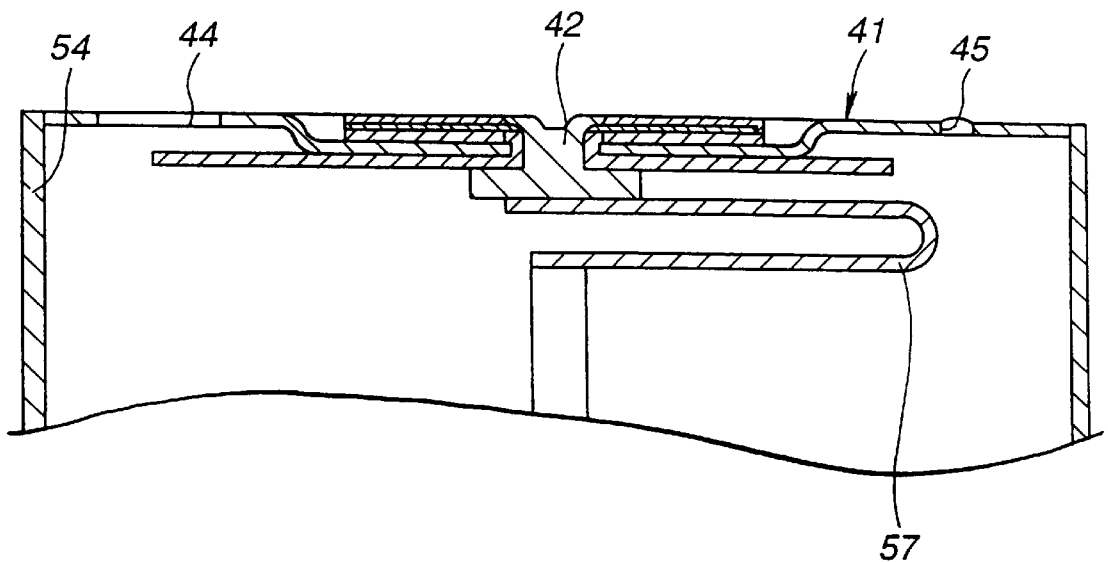
FIG. 15 is a schematic cross-sectional view showing the state in which a positive terminal lead is folded in a direction opposite to the cleavage valve side.

The extracted portion of the positive electrode lead 57 may be folded on itself on the side of the cleavage valve 44 as shown in FIG. 14 or on the opposite side, that is on the side of the solution injection port 45, as shown in FIG. 15. The present inventors have found that the later method is preferred. In the usual use state, it does not matter on which side the extracted portion of the positive electrode lead 57 is folded on itself. It has however been found that if, in a descent test, the extracted portion of the positive electrode lead 57 is folded on itself on the side of the cleavage valve 44, there is the possibility of inadvertent actuation of the cleavage valve 44.

EXAMPLES

Specified examples of the present invention will be explained further with reference being had to experimental results.

Comparative Sample 1

A negative electrode was first prepared in the following manner.

As a starting material of an active material for a negative electrode, 10 to 20 wt % of functional groups containing oxygen are introduced into it for oxygen cross-linking. The resulting mass was fired in an inert gas stream at a temperature of 1000° C. to produce a carbonaceous material having properties close to those of vitreous carbon. The results of X-ray diffractiometry revealed that the plane-to lane separation between (002) planes amounted to 3.76Å. Similarly, measurements by a pycnometer revealed that the true specific gravity was 1.58 g/cm$^3$. This carbonaceous material was crushed to powders of the carbonaceous material having an average particle size of 10 μm.

90 parts by weight of the powders of the carbonaceous material thus produced were mixed with 10 parts by weight of polyvinylidene fluoride (PVDF) as a binder to prepare a negative electrode mixture. This negative electrode mixture was then dispersed in N-methyl pyrrolidone to a paste-like slurry of a negative electrode mixture.

The slurry of the negative electrode mixture was coated on both surfaces of a strip-shaped copper foil 10 μm thick and dried. The resulting dried mass was compression molded in a roll press to produce a band-shaped negative electrode 1. This band-shaped negative electrode was designed so that the thickness of the mixture was 80 μm thick on both sides, with its width and length being 41.5 mm and 505 mm, respectively.

A positive electrode was produced in the following manner.

An active material for the positive electrode (LiCoO$_2$) was synthesized as follows: Lithium carbonate and cobalt carbonate were mixed together so that its Li/Co molar ratio is equal to 1 and the resulting mixture was fired in air at 900° C. for five hours. The results of X-ray diffractiometry testified to good coincidence with LiCoO$_2$ of the JCPDS card. The fired product was pulverized in a mortar to LiCoO$_2$. 91 wt % of this LiCoO$_2$, thus obtained, 6 wt % of graphite as an electrically conductive material and 3 wt % of polyvinylidene fluoride as a binder were mixed to prepare a positive electrode mixture which then was dispersed in N-methyl-2-pyrrolidone to give a slurry of the positive electrode mixture. This slurry of the positive electrode mixture was coated on both surfaces of a band-shaped aluminum foil, 20 μm in thickness, as a positive electrode current collector, and dried. The resulting product was then molded under compression by a roll press to fabricate a positive electrode. Meanwhile, the thickness of the mixture of the band-shaped aluminum foil was set to 80 μm on each surface, with its width and length being set to 39.5 mm and 490 mm, respectively.

The band-shaped positive and negative electrodes and a separator formed by a micro-porous polypropylene film were layered together and wound a number of times on a diamond-shaped take-up core. The trailing end of the layered mass was secured using an adhesive tape 40 mm wide and deformed under pressure to fabricate an oblong-shaped wound electrode member.

This oblong-shaped wound electrode member was housed in a nickel-plated square-shaped cell can of iron along with a spring plate and an insulating plate was arranged on each of the upper and lower surfaces of the electrode member. For collecting the current of the negative electrode, an end of the nickel lead of the negative electrode was press-attached to the electrode, whilst the end of the nickel lead was welded to the positive electrode. Also, for collecting the current of the positive electrode, an end of the aluminum lead of the positive electrode was attached to the positive electrode, with the other end of the lead being welded by laser to a cell lid. In the present Example, no cleavage valve was fitted on the cell lid.

An electrolytic solution, obtained on dissolving 1 mol of LiPF$_6$ in a mixed solvent composed of 50 vol % of propylene carbonate and 50 vol % of diethyl carbonate, was injected via the electrolyte solution injection port. This port was then sealed by electrically welding a steel globule.

By the above process, a square-shaped secondary cell, having a thickness, a height and a width of 9 mm, 48 mm and 34 mm, was prepared.

Samples 1 to 4

Sample cells were prepared in the same way as in comparative sample 1 except using a cell lid provided with a cleavage valve.

The cleavage valve was fabricated by providing an opening in the cell lid, punching a metal foil, formed with a circular pattern (thin-walled portion) by the electro-forming method, to a predetermined size, and by laser-welding the punched metal foil in the opening in the cell lid.

It was found impossible to prepare the opening 2 mm or less in diameter.

The entire thickness of the metal foil was 50 μm and the circular pattern was varied in a range from 5 to 15 μm so that the valve would be cleft at a preset pressure.

The conditions of the cleavage valve was varied as shown in Table 1 to prepare samples 1 to 4.

These cells were charged to 4.2 V and a combustion test was conducted using a gas burner. The results are shown in Table 1.

TABLE 1

|  | diameter of opening in mm | diameter of operating portion in mm | cleavage pressure in kg/cm2 | results of combustion test | dilation of cell (pre-combustion thickness less post-combustion thickness) |
|---|---|---|---|---|---|
| sample 1 | 2 | 1.7 | 20 | cleavage valve in operation; there is rupture in laser weld | 6 mm |
| sample 2 | 2.8 | 2.5 | 20 | cleavage valve in operation; gas ejected | 1 mm |
| sample 3 | 3.8 | 3.5 | 20 | cleavage valve in operation; gas ejected | 0.5 mm |

TABLE 1-continued

|  | diameter of opening in mm | diameter of operating portion in mm | cleavage pressure in kg/cm2 | results of combustion test | dilation of cell (pre-combustion thickness less post-combustion thickness) |
|---|---|---|---|---|---|
| sample 4 | 4.8 | 4.5 | 20 | cleavage valve in operation; gas ejected | 0.5 mm |
| comparative sample 1 | none | none | none | laser weld ruptured and explosion occurred | non-measurable |

If the diameter of the opening was not less than 2.8 mm, the gas could be relieved in a state of only little deformation in the cell can.

Samples 5 to 9

A set of square-shaped secondary cells with the thickness, width and height of 14 mm, 34 mm and 48 mm, respectively, were prepared with the conditions of the cleavage valves changed, with the other conditions remaining unchanged from those of samples 1 to 4.

These cells were charged to 4.2 V and subjected to a combustion test using a gas burner. The results are shown in Table 2.

TABLE 2

|  | diameter of opening if mm | diameter of operating part in mm | cleavage pressure in kg/cm² | results of combustion test | dilation of cell (pre-combustion thickness less post-combustion thickness) |
|---|---|---|---|---|---|
| sample 5 | 2 | 1.7 | 20 | cleavage valve in operation; there is rupture in laser weld | 10 mm |
| sample 6 | 2.8 | 2.5 | 20 | cleavage valve in operation; there is rupture in laser weld | 2 mm |
| sample 7 | 3.8 | 3.5 | 20 | cleavage valve in operation; gas ejected | 0.5 mm |
| sample 8 | 4.8 | 4.5 | 20 | cleavage valve in operation; gas ejected | 0.5 mm |
| sample 9 | 7.5 | 4.5 | 20 | cleavage valve in operation; gas ejected | 0.5 mm |

If the diameter of the opening is not less than 2.8 mm, the gas could be relieved in a state of only little deformation in the cell.

Samples 10 to 12

A set of square-shaped secondary cells with the thickness, width and height of 6 mm, 30 mm and 48 mm, respectively, were prepared under conditions of the cleavage vales changed, with the other conditions remaining unchanged from those of samples 1 to 4.

These cells were charged to 4.2 V and subjected to a combustion test using a gas burner. The results are shown in Table 3.

TABLE 3

|  | diameter of opening in mm | diameter of operating part in mm | cleavage pressure in kg/cm² | results of combustion test | dilation of cell (pre-combustion thickness less post-expansion thickness |
|---|---|---|---|---|---|
| sample 10 | 2 | 1.7 | 20 | cleavage valve in operation; gas is ejected | 1 mm |
| sample 11 | 3.8 | 2.5 | 20 | cleavage valve in operation; gas is ejected | 0.5 mm |
| sample 12 | 3.8 | 3.5 | 20 | cleavage valve in operation; gas is ejected | 0.5 mm |

It was found that, if the diameter of the opening was 2 mm or more, the gas could be released with only little deformation of the cell can.

The results of the above samples 1 to 12, put into order in terms of the K-value (cell volume/cleavage area), are shown in table 4.

TABLE 4

| diameter of opening in mm | area of opening in cm$^2$ | 6 × 30 × 48 volume 8.64 cm$^3$ | K-value cell volume/ cleavage area | 9 × 34 × 48 volume 14.69 cm$^3$ | K-value cell volume/ cleavage area | 14 × 34 × 48 volume 22.85 cm$^3$ | K-value cell volume/ cleavage area |
|---|---|---|---|---|---|---|---|
| 2 | 0.0314 | good | 275 | ruptured | 468 | ruptured | 728 |
| 2.8 | 0.0615 | good | 140 | good | 239 | ruptured | 372 |
| 3.8 | 0.113 | good | 76.5 | good | 130 | good | 202 |
| 4.8 | 0.181 | not mountable | — | good | 81.2 | good | 126 |
| 7.5 | 0.181 | not mountable | — | not mountable | — | good | 51.7 |

As may seen from Table 4, it is effective to have optimum values for K.

Resistance to Environment Test

A resistance-to-environment test was conducted using a cell of sample 3.

In the fully charged state of 4.2 V, a 90% humidification test was conducted under 60° and 90% RH to check the appearance of the cleavage valve. Tests conducted on 20 cells indicated that minute rust was generated in cleft portion of ten cells.

Thus, after welding the metal foil on the opening, a fluorine-based water-proofing agent (trade name: NOX guard) was dripped and dried. Similar tests conducted on the dried products indicated that no rusting occurred.

Therefore, it may be said that coating of the metal foil constituting the cleavage valve is indispensable for improving reliability in practical application.

Researches into the Method of Forming Metal Foil

The metal foil constituting the cleavage valve is prepared by an electro-forming method, a cladding method, a stamping method, an etching method and a method directly using the foil. For each of these foils, variations in the cleavage pressure was checked using air. The results are shown in Table 5.

TABLE 5

| methods of forming cleavage valves | average value of operating pressure in kg/cm$^2$ | standard deviation of fluctuations in kg/cm$^2$ | notes |
|---|---|---|---|
| electro-forming method | 20 | 1.1 | |
| cladding method (bonding a 40 μm foil and a 10 μm foil together | 20 | 1.5 | |
| stamping method for foil (pressing a mark on a 50 μm nickel foil) | 20 | 1.2 | |
| etching method | 19 | 3.9 | |
| only foil (10 μm thick) | — | — | not laser weldable |

The electro-forming and mark stamping methods gave good results because of only little fluctuations. Second to these methods was the cladding method employing a thick foil and a thin foil in combination. For practical application, these three sorts are thought to be preferred. If the etching method is used, difficulties are estimated to be met in management because of significant fluctuations. Researches into the Folding Direction of the Positive Terminal Lead A sample having an electrode structure similar to that of sample 3 and having the folding direction of the positive terminal lead towards the cleavage valve (below the cleavage valve) and another sample having the folding direction of the positive terminal lead in the opposite direction, that is in a direction away from the cleavage valve.

These indicated no significant difference in the above test.

However, the two samples showed difference in the descent test. The results of the descent test, in which the cells were dropped from a height of 1.5 m, are shown in Table 6.

TABLE 6

| lead position | combustion test | descent test |
|---|---|---|
| below the cleavage | cleavage valve in operation; gas ejected; no inconvenience | cleavage valve in operation; liquid leakage occurred 6/20 |
| away from the cleavage | cleavage valve in operation; gas ejected; no inconvenience | cleavage valve not in operation; liquid leakage occurred 0/20 |

The results indicated significant difference depending on the lead position, that is that it is more preferred to bend the lead in the direction away from the cleavage area. By fabricating the valve in this manner, it becomes possible to produce a cell having high safety.

What is claimed is:

1. A non-aqueous electrolyte secondary cell comprising:
    a positive electrode comprising a positive metallic foil capable of serving as a positive current collector and a positive active material layer formed on opposite sides of said positive metallic foil, said positive active material layer formed of a lithium complex oxide;
    a negative electrode formed of a negative metallic foil capable of serving as a negative current collector and a negative active material layer formed on opposite sides of said negative metallic foil, said negative active material formed of a carbon material capable of being doped with a lithium ion, a metal lithium, or a lithium alloy;

a separator disposed between said positive electrode and said negative electrode;

said positive electrode, negative electrode and said separator being spirally wound together into a spirally wound structure, wherein said positive active material layer and said negative active material layer are arranged opposite to each other through said separator;

a cleavage valve which is realized by bonding a metal foil to an opening in the cell, said metal foil being cleft due to rise in the internal pressure in the cell to release the pressure and wherein the valve comprises a thin-walled portion formed in said metal foil, said thin-walled portion having a thickness less than the thickness of said metal foil, and said thin-walled portion disposed radially internally of said opening in said cell; and wherein a value K corresponding to the internal cell volume in $cm^3$ divided by the area of the opening in $cm^2$ is such at $40 \leq K \leq 350$ cm.

2. The non-aqueous electrolyte secondary cell according to claim 1 wherein the metal foil has a thickness of 40 to 100 $\mu$m.

3. The non-aqueous electrolyte secondary cell according to claim 1 wherein a fluorine-based water-proofing agent is coated on the surface of said metal foil.

4. The non-aqueous electrolyte secondary cell according to claim 1 wherein the opening is circular or oblong in shape.

5. The non-aqueous electrolyte secondary cell according to claim 1, wherein the metal foil is formed by an electro-forming method and wherein the thin-walled portion is formed facing said opening.

6. The non-aqueous secondary cell according to claim 1 wherein the thin walled portion is a groove formed by stamping the metal foil for facing the opening.

7. The non-aqueous electrolyte secondary cell according to claim 1 wherein the metal foil is cladding material obtained on bonding plural metal foils and wherein these metal foils are partially removed at a portion facing the opening to present the thin-walled portion.

8. The non-aqueous electrolyte secondary cell according to claim 1 wherein a cell element is housed in a cell can and an opening of the cell can is sealed by a lid plate, said cleavage valve being formed on said lid plate.

9. The non-aqueous electrolyte secondary cell according to claim 8 wherein a terminal pin is mounted on said lid plate and connected to a lead extended from the cell element.

10. The non-aqueous electrolyte secondary cell according to claim 9 wherein said lead is folded in a direction opposite to the mounting site of the cleavage valve on the lid plate.

11. The non-aqueous electrolyte secondary cell according to claim 9 wherein said lid plate is formed with an injection opening for the electrolytic solution.

12. The non-aqueous electrolyte secondary cell according to claim 1 and wherein said thin walled portion has a thickness of 5 to 15 $\mu$m.

* * * * *